United States Patent [19]

Ferrer

[11] Patent Number: 4,799,765
[45] Date of Patent: Jan. 24, 1989

[54] INTEGRATED HEAD-UP AND PANEL DISPLAY UNIT

[75] Inventor: John J. Ferrer, Los Angeles, Calif.

[73] Assignee: Hughes Aircraft Company, Los Angeles, Calif.

[21] Appl. No.: 105,527

[22] Filed: Sep. 24, 1987

Related U.S. Application Data

[63] Continuation of Ser. No. 846,445, Mar. 31, 1986.

[51] Int. Cl.⁴ .......................... G02B 27/14; G02B 5/18; G02B 5/28
[52] U.S. Cl. ................................ 350/174; 350/162.23; 350/166
[58] Field of Search ..................... 350/3.7, 162.23, 166, 350/174

[56] References Cited

U.S. PATENT DOCUMENTS

| | | | |
|---|---|---|---|
| 3,885,095 | 5/1975 | Wolfson et al. | 178/7.88 |
| 3,940,204 | 2/1976 | Withrington | 350/3.5 |
| 4,264,134 | 4/1981 | Ellis | 350/174 |
| 4,318,970 | 3/1982 | Kurland et al. | 430/2 |
| 4,372,639 | 2/1983 | Johnson | 350/3.7 |
| 4,425,028 | 1/1984 | Gagnon et al. | 350/337 |
| 4,461,542 | 7/1984 | Gagnon | 350/331 |
| 4,545,646 | 10/1985 | Chern et al. | 350/162.2 |
| 4,586,780 | 5/1986 | Chern et al. | 350/3.7 |
| 4,586,781 | 5/1986 | Gunther et al. | 350/3.7 |

FOREIGN PATENT DOCUMENTS

| | | |
|---|---|---|
| 0009332 | 4/1980 | European Pat. Off. ............ 350/174 |
| 2552397A | 3/1985 | France . |
| WO84/00615 | 2/1984 | PCT Int'l Appl. . |
| 2006981 | 5/1979 | United Kingdom ................ 350/174 |
| 2022285A | 12/1979 | United Kingdom . |
| 2049984A | 12/1980 | United Kingdom . |
| 2149140A | 6/1985 | United Kingdom . |

OTHER PUBLICATIONS

Proceeding of the S.I.D., vol. 19/4, 4th Quarter 1978, M. Ernstoff: "A Head-Up Display for the Future", pp. 269–179.
Abstracts of New Technology from the Air Force Systems Command, Air Force Avionics Laboratory, Wright-Patterson Air Force Base, (Dayton, Ohio, U.S.), M. N. Ernstoff et al.: "Liquid Crystal Diffraction Optics HUD", document No. PB81-970247, see Figure.

Primary Examiner—John K. Corbin
Assistant Examiner—Ronald M. Kachmarik
Attorney, Agent, or Firm—Leonard A. Alkov; A. W. Karambelas

[57] ABSTRACT

An integrated head-up and panel display system for aircraft cockpits and the like is disclosed. The system utilizes a wavelength-sensitive fold mirror to separate the HUD image and the panel images. The system includes a monochromatic HUD image source for projecting the HUD image toward the fold mirror, and at least one panel display image source for projecting panel imagery toward the fold mirror. The transmission function of the fold mirror is notched at the wavelength of the monochromatic HUD image source. Thus, the fold mirror reflects the HUD image in the direction of the HUD optical combiner which reflects the HUD image to the system exit pupil. The fold mirror is adapted to transmit light in the visible spectra outside the narrow bandwidth of the HUD image source, so that the panel image is transmitted through the fold mirror to a look-down display screen assembly. The screen assembly may be a diffusion screen for providing an image plane at the screen, or an assembly of optical elements for providing a panel image superimposed at the system exit pupil.

23 Claims, 8 Drawing Sheets

INTEGRATED HEAD-UP AND PANEL DISPLAY UNIT

This application is a continuation of application Ser. No. 846,445, filed Mar. 31, 1986.

BACKGROUND OF THE INVENTION

The present invention relates to display systems such as are employed in aircraft cockpits and, more particularly, to an integrated display unit which provides a head-up display (HUD) and a color panel display in an aircraft cockpit.

Head-up displays are well-known in the art. For example, U.S. Pat. No. 3,940,204 (Withrington), assigned to a common assignee with the present application, discloses a head-up display system utilizing a holographic combiner.

One of the major system level problems with HUDs of any type is their necessary location in the prime area at the top center of the aircraft instrument panel. That area, which is the most visible portion of the instrument panel, is occupied by the HUD fold mirror and is therefore unavailable for other display purposes. As a result, the panel displays are mounted at the sides and below the HUD, and the size of the panel displays are accordingly limited. The up-front panel space in existing HUDs, is used only for shallow indicators, switches or flags, i.e., devices that would otherwise be mounted on less important areas of the instrument panel.

These limitations are detrimental to the goal of providing the pilot with highly visible display information needed to ensure mission success and pilot survivability. As a result, there exists a need to fit as much information as possible into the prime location of the front cockpit panel.

U.S. Pat. No. 3,885,095 (Wolfson et al.), assigned to a common assignee as the present application, describes a combined head-up and multisensor panel display system. This system utilizes a single cathode ray tube or other image generating device to provide both a head-up display and a multisensor panel display. The system includes a manual switch operated by the pilot to select either the head-up or the panel display operation; only one display is operable at any given instant. During highly stressed operational conditions, the switching operation can be a significant burden on the pilot, distracting him from other flight tasks.

It would therefore be an advance in the art to provide an integrated HUD and front panel color display apparatus which not only fulfills the need for a HUD, but also simultaneously provides a front panel display in the same area of the instrument panel.

SUMMARY OF THE INVENTION

An integrated head-up and panel display system is disclosed. The system comprises a first image source for projecting a narrow-band HUD image and a second image source for projecting a color panel display image. The two images are projected toward a wavelength-sensitive diffraction fold mirror arranged to substantially reflect light within the narrow spectral band of the first image toward a HUD optical combiner, and to substantially transmit visible light outside the narrow spectral band of the first image. The HUD optical combiner is constructed and oriented to reflect the first narrow-band image to the system exit pupil while transmitting light in the visible spectra outside the narrow band. The second image is substantially transmitted through the fold mirror and impinges on a lookdown display (LDD) screen assembly located behind the fold mirror in the same area of the instrument panel. In a simple form, the screen assembly comprises a conventional diffusion screen, and the panel display image is visible to the pilot when looking from any position. In a more sophisticated form, the screen assembly is adapted to provide a panel image only observable in the region of the HUD exit pupil. From conservation of energy principles, this results in a much brighter panel image observable by the pilot. In the latter case, the fold mirror, the LDD screen assembly, and the HUD combiner are cooperatively oriented to present both the narrow-band image and the color image at the exit pupil.

These and other features and advantages of the present invention will become more apparent from the following detailed description of an exemplary embodiment thereof, as illustrated in the accompanying drawings.

DESCRIPTION OF THE PREFERRED EMBODIMENTS

Figure 1:
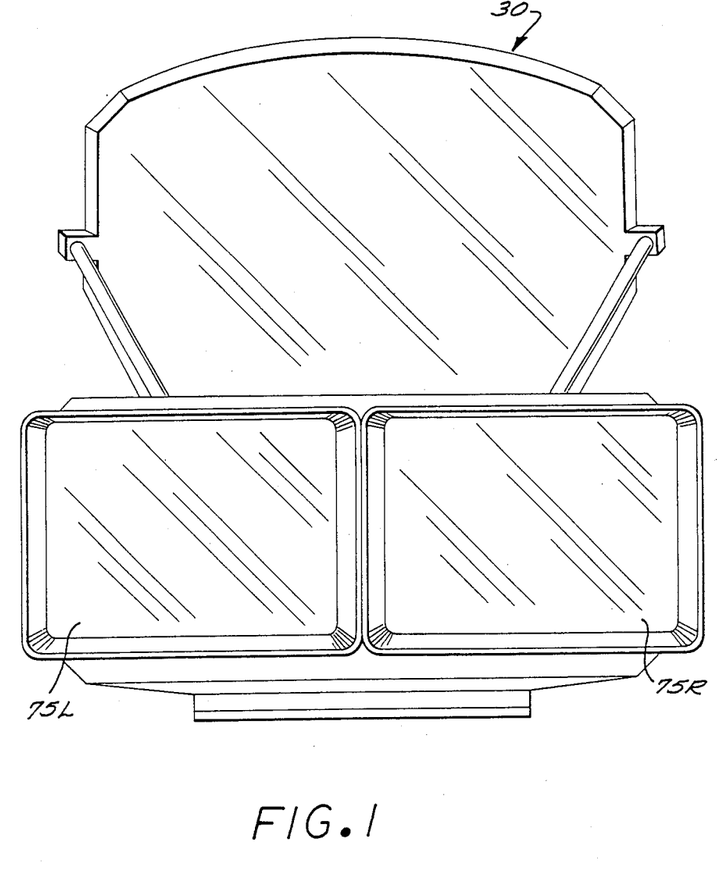
FIG. 1 is a frontal view of the integrated head-up and color panel display system.

A front view of an integrated head-up and panel display system for aircraft is shown in FIG. 1. The system provides a head-up display to the pilot as well as two separate, side-by-side, panel displays, all mounted in the same housing. The system comprises the HUD optical combiner 30 and the left and right look-down display (LDD) screen assemblies 75L and 75R.

Figures 2A, 2B:
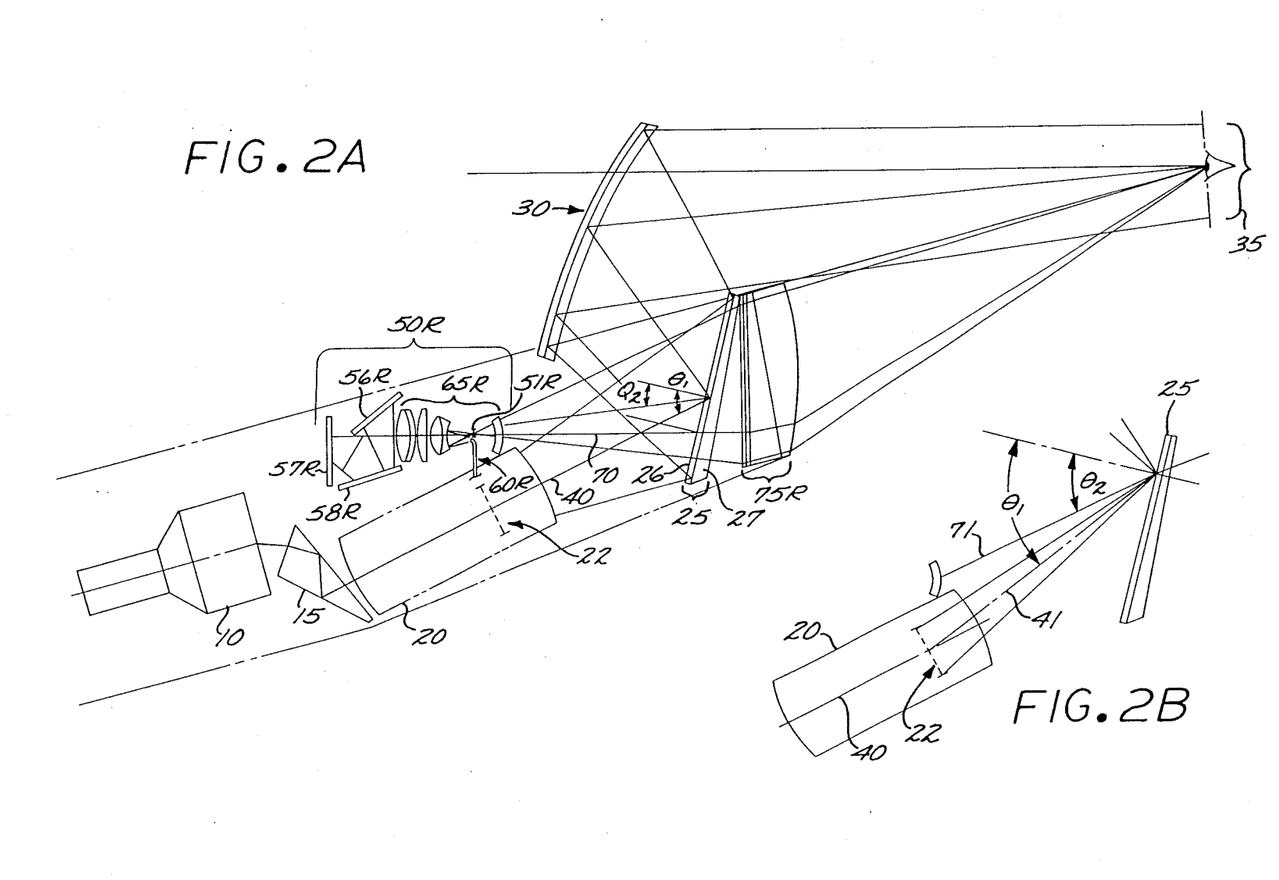
FIG. 2A is a sectional side view of an integrated head-up and color panel display system in accordance with the invention.
FIG. 2B is an optical diagram showing the angular orientation of the light from the HUD image source and the light from the panel image source in relation to the fold mirror.

Referring now to FIG. 2A, a side view of the integrated display system of FIG. 1 is disclosed. The integrated HUD and color panel display system comprises a cathode ray tube (CRT) 10 which serves as the HUD image source. For the disclosed embodiment, the CRT 10 comprises a P43 phosphor coating on the CRT faceplate, and provides a very narrow-band light source centered at a wavelength of 543 nanometers (nm) in the visible green spectrum. As is well-known to those skilled in the art, the CRT 10 is driven by image generation circuitry to provide HUD imagery.

The CRT display is imaged by the relay lens 20 in a highly aberrated form in the region near the fold mirror 25. The prism 15 is frequently employed to provide a more desirable geometrical envelope. The reimaged HUD display light is redirected towards the HUD combiner 30 by the fold mirror 25. The HUD combiner 30 is an optical element having diffractive power in the region of the CRT 10 phosphor spectral output. Its orientation and position images the relay lens pupil 22 at or near the intended observer's eye location called the system exit pupil 35, and essentially collimates the image provided by the relay lens 20. Central ray 40 light indicates the passage of the HUD image through the optical elements 15, 20, 25, and 30.

The fold mirror assembly 25 is a dual purpose optical element, adapted to reflect light having a wavelength within the narrow-band spectral region occupied by the HUD image light and to transmit light of wavelengths outside the narrow-band region of the HUD image light. The construction of the fold mirror 25 will be described in more detail hereinbelow.

The color panel display comprising the integrated display system includes two panel display image sources, which in the preferred embodiment comprise three-color liquid crystal matrix display assemblies 50L and 50R. Only assembly 50R is visible in the side view of FIG. 2A. Assembly 50R is typical of the panel image sources, and includes lens assembly 65R and liquid crystal matrices 56R, 57R and 58R which are respectively illuminated with illumination light provided remotely through a fiber optic bundle 60R from a remote source of illumination light (not shown). In such liquid crystal matrix displays, each pixel is electronically addressed to an "on" or "off" state. In the "off" state, the pixel is specularly reflective and redirects the illumination light back through the system aperture 51R, yielding a bright spot at the screen. In the "on" state, the pixel scatters light, thereby greatly reducing the light that can get back through the system, yielding a dark spot at the screen. For many applications, the liquid crystal matrix projector may be desirable due to its relatively small projection aperture. For example, in the disclosed embodiment the aperture 51R is quite small, passing only light rays within 2° of the central light rays from the matrices.

The panel display image sources alternatively may comprise LCD light valves to provide the panel image light. In a full-color light valve projector, the illumination light is passed through a projector and beam splitter lens assembly (which may comprise lens assembly 65R) which polarizes the illumination light, splits the illumination light into three respective color beams, and directs the respective components of the polarized illumination light to the respective liquid crystal light valve surfaces (which may comprise elements 56R, 57R and 58R). The light valve surfaces are modulated with the respective blue, green and red color components of the panel display image by respective image sources (not shown) such as a small CRT. The illumination light is reflected from the respective light valve surfaces in accordance with the respective color components of the image, and the resultant projection light is passed through the beam splitter and projection lens assembly which superimposes the respective color component images at a projection aperture.

LCD light valve projectors are known to those skilled in the art. Exemplary color light valve projectors are described in U.S. Pat. Nos. 4,425,028 and 4,461,542, assigned to a common assignee with the present application.

As will be appreciated by those skilled in the art, the panel display need not necessarily employ full color display sources and could instead comprise monochromatic image sources. Similarly, the sources need not be liquid crystal sources, but could be any type of image source.

The center ray 70 from source 50R is directed to impinge on the fold mirror 25 and is substantially transmitted through the wavelength-sensitive fold mirror assembly 25 to the look-down display (LDD) screen assembly 75R located behind the fold mirror 25 on the same area of the instrument panel. In one form, the assembly 75R comprises a conventional diffusion screen, and the panel display image is visible to the pilot when looking down at the screen. In a more sophisticated form, the assembly 75 may comprise a Fresnel lens, a color diffraction diffusion hologram, a fiber optic faceplate, and a field lens adapted to provide a highly efficient display as observed from the region of the HUD exit pupil 35. The LDD screen assembly is described more fully hereinbelow.

Referring now to FIG. 2B, the respective angular orientations of the light from the HUD image source and the panel image source in relation to the surface of the fold mirror is shown in further detail. The HUD image light from the HUD relay lens 20 is shown as a cone of light with center ray 41 which impinges on the fold mirror 25 at angle $\theta_1$ from the normal to the mirror 25. There is a different magnitude of $\theta_1$ for each position on the fold mirror, i.e., as the cone of light with center ray 41 is scanned across the surface of mirror 25.

Ray 71 from the panel display image source impinges on the same point on the surface of the mirror 25 at angle $\theta_2$ with respect to the normal to the surface. As with the light from the HUD image source, there is a different angle of incidence $\theta_2$ for each position on the fold mirror, i.e., as the ray 71 is scanned over the surface of the fold mirror 25. If the HUD image source and the panel image source are properly oriented in relation to one another and the fold mirror, the relative difference between the respective angles $\theta_1$ and $\theta_2$ will be substantially constant for all points of incidence on the fold mirror 25 of interest in the particular application.

The fold mirror 25 will typically comprise a transparent substrate carrying a holographic recording medium. The mirror may also comprise a substrate on which is applied a graded-index coating, as by the process described in U.S. Pat. No. 4,545,646, entitled "Process for Forming a Graded Index Optical Material and Structures Formed Thereby." The fold mirror 25, whether constructed with a hologram coating, a graded-index coating or by another technique, is designed to reflect a narrow-band range of wavelengths and to transmit light of wavelengths outside the narrow-band range. The narrow-band range is centered at a particular wavelength which shifts as the angle of incidence is shifted from the intended operating direction for the HUD. The center frequency at the intended angle of incidence for the HUD is typically referred to as the "hologram wavelength." Thus, for a particular diffraction optical device, the wavelength of light which will be reflected by the device shifts away from the hologram wavelength for that device as the angle of incidence of the light on the device is shifted away from the intended operating direction for the HUD. The optical device is considered to have an angular reflectivity function which characterizes the reflectivity as a function of the angle of incidence for a given wavelength of impinging light.

The angular reflectivity function of diffraction optical elements allows the respective angles of incidence $\theta_1$ and $\theta_2$ of the HUD image light and the panel image light on the mirror 25 to be selected so that the HUD image and the panel image can both comprise light at the same wavelength, for example, green at 543 nm. To achieve this, the two angles are sufficiently different and selected in accordance with the angular reflectivity function of the particular fold mirror 25 so that the HUD light (e.g., at 543 nm) is incident at the particular angle of incidence at which light of this wavelength is reflected. Selecting a different angle of incidence for the panel image light results in panel image light of a different wavelength (than 543 nm) being reflected. The particular color of the panel image light to be reflected may be selected in dependence on the characteristics of the panel image source. For some liquid crystal color projectors, the yellow component at about 585 nm is typically quite weak. Thus, for that type of image source, virtually no image light is produced in that wavelength, and there will be little intensity lost through reflection by the fold mirror, while the green, red and blue components are transmitted. For other image projectors, some other reflection color may be appropriate.

Figure 3:
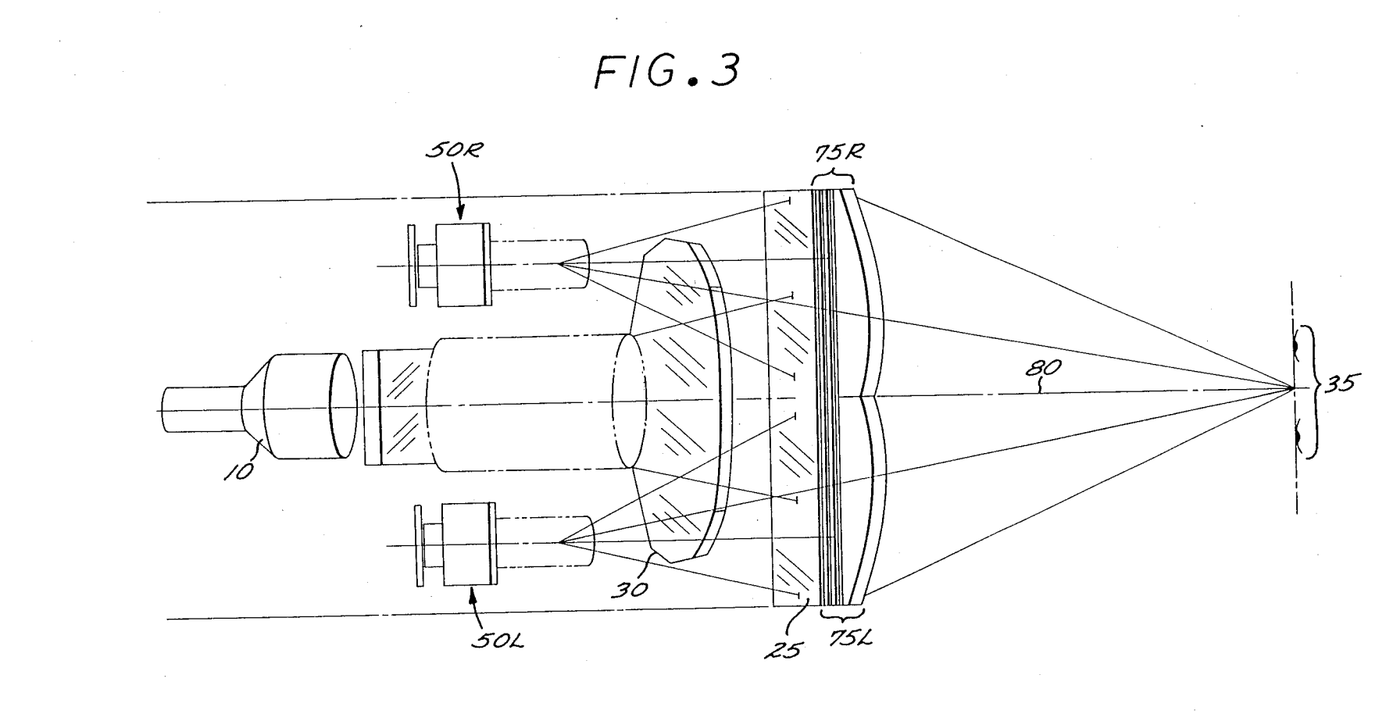
FIG. 3 is a top view of the display system.

FIG. 3 is a top view of the integrated display system, further illustrating the relative orientation of the image sources and various optical elements of the system. The CRT 10 is oriented along the central axis 80 of the system, while the LCD panel image sources 50L and 50R are displaced to either side of the central axis 80. For the disclosed embodiment, the system includes two separate and side-by-side panel displays. However, it will be appreciated by those skilled in the art that the number of panel displays in a particular system is a matter of design choice and dependent on the availability of space within the cockpit.

The fold mirror 25 functions to reflect the HUD image light toward the HUD combiner 30 while simultaneously transmitting the panel display image light to its respective adjacent LDD screen assembly. The mirror 25 accomplishes these functions without allowing the HUD symbology to appear superimposed on the panel display or the panel display information to appear in the HUD combiner. An objective of the mirror 25 is to perform these functions without degrading the accuracy of the HUD or the color uniformity of the panel display. To achieve these objectives requires careful adjustment of both the angular and spectral bandwidth of the fold mirror 25 with respect to the LDD location and the HUD relay lens location.

As described above, the fold mirror 25 is adapted to reflect the light for the HUD monochromatic image source and to transmit light in the visible spectra excluding the narrow band required for the HUD. If the respective angles of incidence $\theta_1$ and $\theta_2$ of the HUD and the panel image light on the fold mirror 25 at a particular point on the fold mirror 25 were identical, then the transmission response of the mirror 25 would be notched at the CRT wavelength to reflect the HUD image. For a CRT with the P43 phosphor, the CRT wavelength is in the middle of the visible spectrum (543 nm), a strong green. If the two angles of incidence are sufficiently different, then the strong green color from the panel display source can be suitably transmitted to enhance the LDD color display. It has been found that the angular difference between the respective angles of incidence can be made sufficiently large so that the light from the panel display image source falls substantially outside the cone-like region defining the angles of incidence at the HUD image source wavelength which will be reflected by the mirror 25. As a result, most of the colors in the panel display image will be transmitted by the mirror 25 and there will be little crosstalk between the panel display image and the HUD image. Moreover, any incidental portion of the light from the panel display image source which may be reflected by the mirror 25 will, in turn, be reflected by the HUD combiner 30 into a region falling outside the exit pupil 35. Hence, that image will not appear to the pilot to be superimposed on the HUD image.

If the system were designed such that the respective angles of incidence of the HUD and panel image light were the same, a green filter (543 nm) would be placed at the output of the panel image source to block the green light, which would otherwise be reflected by the fold mirror and be superimposed on the HUD exit pupil. Preferably, the system is arranged such that the two angles of incidence are substantially different, avoiding the requirement for such a filter.

Figure 4:
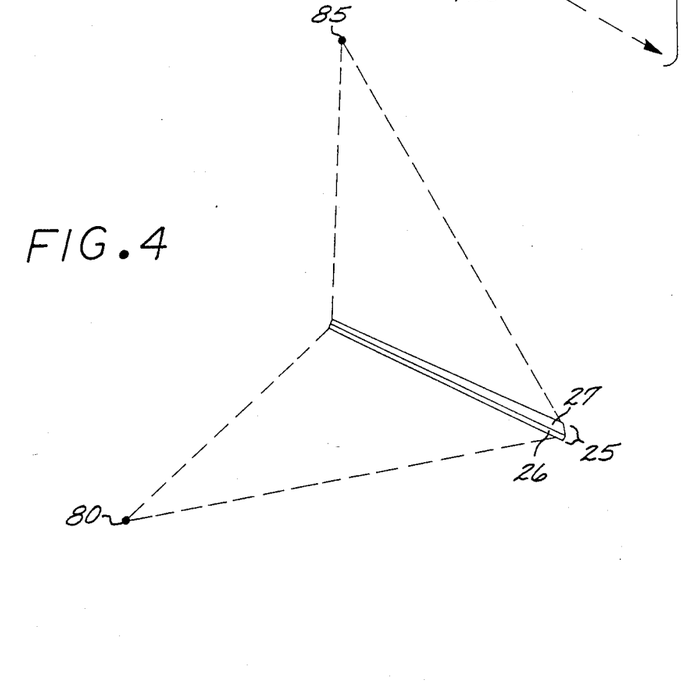
FIG. 4 is a side elevation optical diagram illustrating the construction optics for the fold mirror of the system.

FIG. 4 illustrates one method by which the fold mirror 25 can be fabricated as a holographic diffraction device. Point sources 80 and 85 provide focused coherent monochromatic light. Preferably the light for sources 80 and 85 is from the same source (such as a laser) optically directed as shown.

The fold mirror comprises layer 26 of sensitized gelatin mounted on transparent substrate 27. The gelatin is to be exposed and developed to comprise the wavelength-sensitive fold mirror 25. A particular example of the gelatin and its exposure and development is described in U.S. Pat. No. 4,318,970, which is incorporated herein by reference.

In order to expose the sensitized gelatin, interfering wavefronts within the gelatin produce a latent image which can be developed to cause minute variations in the refractive index and/or absorption. Point source 80 illuminates the gelatin layer 26 and represents the direction of the incoming light from the HUD image source which is to illuminate the fold mirror 25. While the light from CRT 10 is typically at 543 nm, an argon laser is a commercially available light source which may be employed as the point source 80. The construction wavelength used to fabricate holographic diffraction elements often varies from the intended playback wavelength for practical reasons due to the availability of the respective construction and playback sources. Any wavelength distortion due to the difference between the construction and playback wavelengths can be compensated by techniques wellknown to those skilled in the art, such as by appropriately changing the angle of incidence of the construction light from that of the playback light, or by proper baking of the gelatin after exposure to reduce its thickness.

Point source 85 is located at the mirror image of the location of point source 80 in relation to gelatin layer 26. The illumination from sources 80 and 85 causes the interfering wavefronts in the gelatin layer 26, resulting in the production of a latent image in the holographic sensitive gelatin. The exposed gelatin is then developed to comprise the fold mirror 25.

The screen 75R may comprise a conventional diffusion screen, which scatters the incident light in all directions; thus, an observer may see projected imagery from all directions. However, the disadvantage of such a screen is that the observer receives only a very small fraction of the incident light energy and the image brightness is sacrificed.

High gain diffusion screens, which only scatter the incident light into a small solid angle cone, may advantageously be employed in the system. With such a screen, an observer can perceive a brighter image, but only within a smaller viewing volume. Outside the viewing volume, the observer will see a very dim image or no image at all.

Most high-gain screens scatter light into a cone around the direction that obeys either Snell's law or the reflection law. Alternatively, lenticular screens comprising many tiny lenticules to control the light distribution pattern can be designed to provide special light direction and distribution.

Holography has been applied to produce directional diffusion screens that function as lenticular screens. A directional screen can be constructed by exposing a hologram using a point source located at the would-be projector position and a diffuser source located at the place corresponding to the viewing volume. When the exposed hologram is used as a screen, the projector projects an image onto the hologram which in turn diffusely directs the light toward the viewing volume. This type of screen is preferably employed in the embodiment of screen assembly 75 illustrated in FIG. 5.

Figure 5:
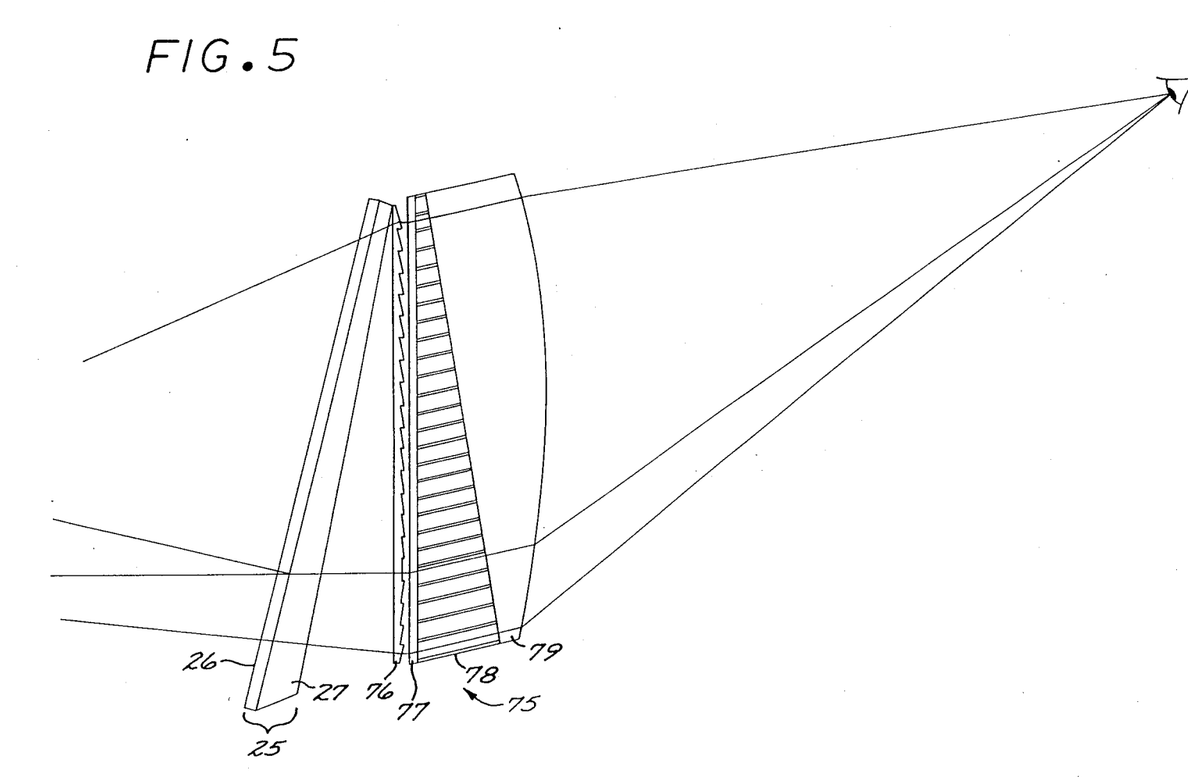
FIG. 5 is a cross-sectional view of a look-down display screen assembly which may be utilized with the system of FIG. 1.

In a more sophisticated form, the screen assembly 75L or 75R may comprise the assembly 75 illustrated in the cross-sectional view of FIG. 5. The assembly comprises a Fresnel lens 76, a diffusion screen 77, a fiber optic faceplate 78 and an off-axis field lens segment 79.

The purpose of the Fresnel lens is to collimate the light transmitted by the fold mirror 25, so that the light rays passed by lens 76 are parallel. This allows the use of a homogeneous diffusing screen 77, simplifying the construction of this element.

The diffusing screen 77 diffuses the image light from the image source over the entire area of the exit pupil. A diffusing screen is typically employed when the image source has a relatively small aperture compared with its projection on the exit pupil. In systems wherein the image source aperture is comparable in size to the exit pupil, the diffusing screen may be eliminated.

The fiber optic faceplate 78 is adapted to direct the output light from the diffusion screen 77 in the direction of the exit pupil 35. Fiber optic faceplates of the type contemplated for use in the assembly 75 are described, for example, in U.S. Pat. No. 4,586,780 (Chern et al.), assigned to a common assignee with the present application.

The output light from the fiber optic faceplate 78 is collimated. The field lens 79 refracts the output light to converge at the exit pupil 35.

Figure 6:
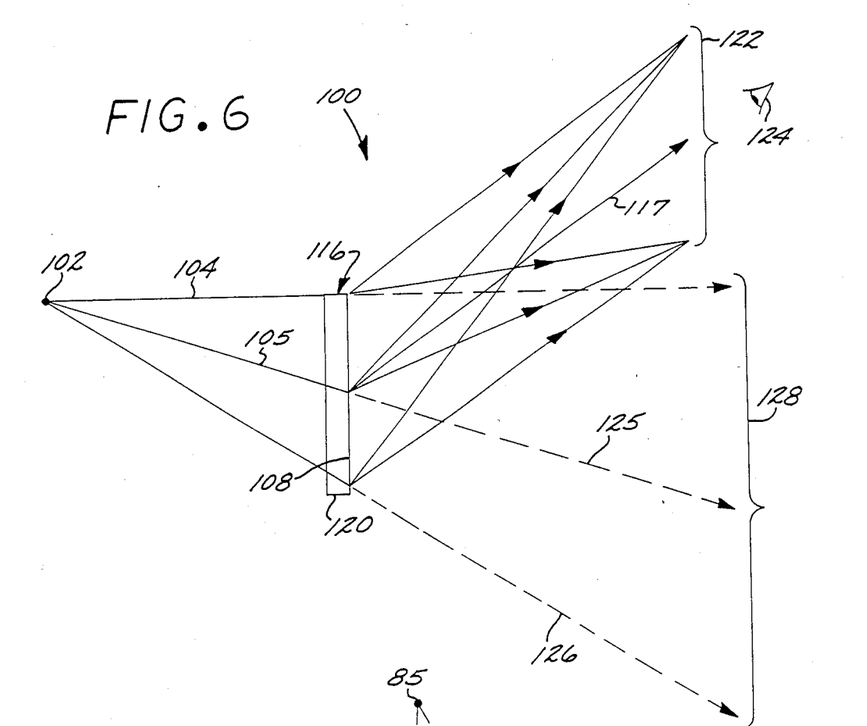
FIG. 6 is a schematic side elevation optical diagram of a directional diffusing screen and its principal optical paths which may be utilized with the invention.

To more clearly explain the function and construction of the diffusion screen 77 and fiber optic faceplate 78, FIG. 6 illustrates an optical system 100 in which a point light source 102 projects a light beam 104 through diffusing screen 116. For this example, the beam 104 carries information in this form of lateral or temporal modulation. Diffusing screen 116 may comprise a holographic optical element, wherein a gelatin film 108 is mounted on a supporting substrate 120, such as optical glass. The optical element 116 causes diffraction of the beam 104 so that the beam is diffused and spread across the viewing exit pupil 122 where it is perceived by observer 124.

Most of the light in beam 104 is diffracted by screen 116 and directed into the exit pupil 122. However, because the screen 116 is a practical and therefore imperfect device, a portion of the light is undiffracted by screen 116, and passes straight through the screen to become the undiffracted, zero-order beam 126 which is seen across the zero-order pupil 128. Such zero-order light degrades the performance of the diffusing screen by illuminating the area around pupil 122 and thus reducing the exit pupil image contrast.

Figure 7:
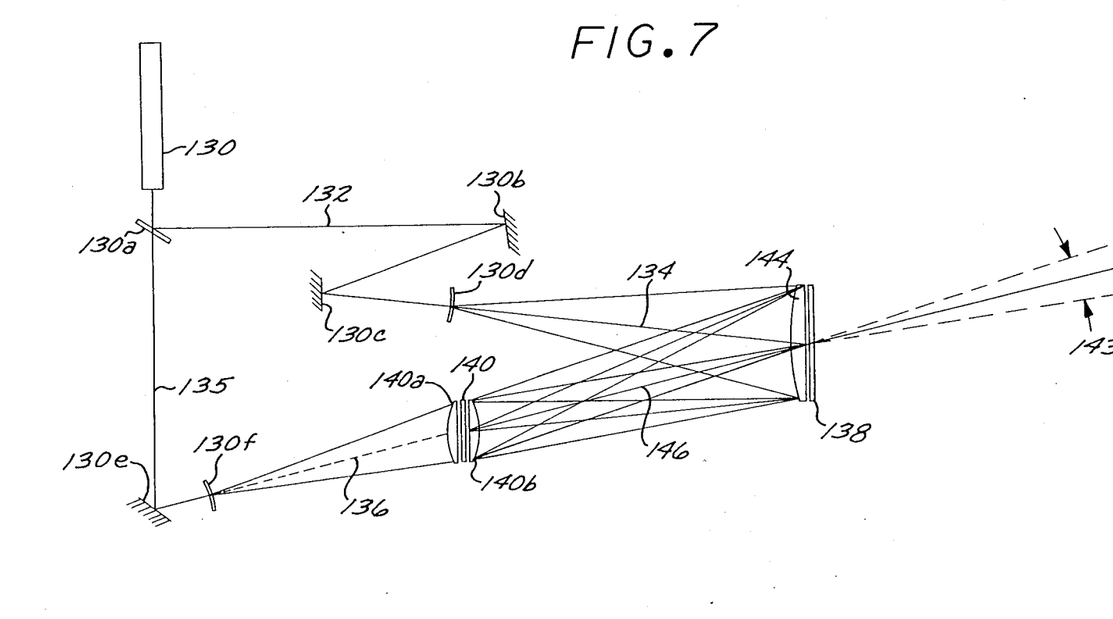
FIG. 7 is a schematic side elevation optical diagram showing the construction optics for the diffusing screen of FIG. 6.

FIG. 7 illustrates one method by which the diffusing screen 116 can be fabricated as a homogenous holographic diffraction device. Argon laser 130 provides focused coherent monochromatic light, which is split by beam splitter 130a into two beams 132 and 135. Beam 132 is directed by mirrors 130b and 130c through spatial filter 130d, resulting in a cone of light rays with center ray 134.

Holographic sensitive plate 138 is to be exposed and developed to become the screen 116. Plate 138 may comprise any conventional holographic recording medium. A particular example is described in more detail in U.S. Pat. No. 4,318,970, referred to hereinabove.

In order to provide suitable exposure, interfering wavefronts within the plate cause a latent image which can be developed to cause minute internal variations in refractive index and/or absorption. Light from source 130 and having center ray 134 illuminates the plate 138 through the collimating lens 144 and represents the direction of incoming light (such as source 102) which is to illuminate the developed hologram of diffusing screen 116. Thus, the central ray 134 from source 130 to the plate 138 corresponds to the central ray 105 to the screen 116 in FIG. 6.

Light beam 135 from beam splitter 130a is directed by mirror 130e through spatial filter 130f, resulting in a cone of light having center ray 136. This light illuminates field lens 140a, which collimates the light. The collimated light illuminates conventional diffusing screen 140, which may comprise, for example, ground glass. If the ground glass is uniform, it presents a uniformly illuminated screen. If a nonuniform illumination density is desired, this may be accomplished by controlling the lateral illumination density of screen 140.

The image of the illuminated diffusing screen 140 is converged by field lens 140b at the center of plate 138. Collimating lens 144 straightens the ray bundles incident at any point on plate 138 such that the bundle axes are parallel.

The illumination from diffusing screen 140 and from light beam 132 cause the production of a latent image in holographic sensitive plate 138. This plate is then developed to become directional diffusing screen 116. When the directional diffusing screen 116 is illuminated from a monochromatic source 102, the image seen at viewing exit pupil 122 is the image of the diffusing screen 140.

This construction results in a desired operating cone 143 of illumination rays leaving plate 138 which is directed in the desired manner. The directional diffusing screen 116 constructed in this manner thus has the property that little energy is dissipated outside of the desired illumination toward the viewing pupil. In addition, the central ray 117 is directed at an angle away from the central ray 105 to such an extent that the viewing pupil 122 is completely away from the envelope 126 of the zero-order beam with center ray 125. Thus, the observer 124 does not directly see, from his position, any of the direct zero-order beam.

Another technique for making the holographic diffusing screen 116 is described in greater detail in U.S. Pat. No. 4,372,639, the disclosure of which is incorporated herein by reference.

Figure 8:
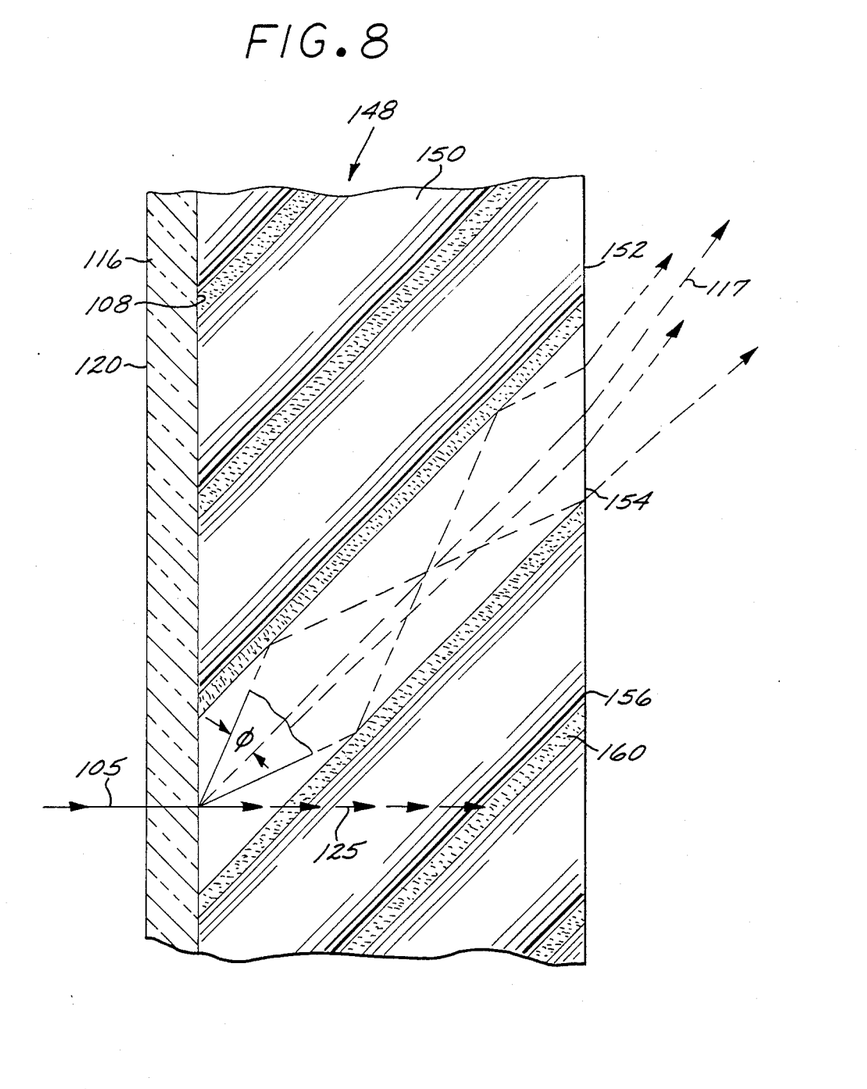
FIG. 8 is a sectional view through a transmission holographic diffusing screen in association with an angularly oriented fiber optic faceplate to form a diffraction optics diffusing screen.

The zero-order light passing through the diffusing screen 116 can be suppressed in a fiber optic faceplate 148, as shown in FIG. 8, comprising a slab angularly cut from a bundle of many microscopically thin optical fibers which are adhesively secured to each other. For example, as shown in FIG. 8, optical fibers 150, 152, 154, and 156 are cemented together with cement 160. In practice, these fibers are cemented together in a long bundle, and a slab is angularly cut therefrom to form the faceplate 148. When the light entering each fiber is at a small enough angle to the fiber center line, the light propagates through the fiber by repetitive total internal reflections off the interface, while light entering the fiber at too steep an angle partially passes through the interface and is absorbed in the light absorbing material between the fibers. The multiple reflection in the fiber serves to scramble the light about the fiber axis which effectively widens the output diffuse light cone.

The operation of the faceplate is illustrated in FIG. 8. That portion of the center ray 105 which is not diffracted in holographic diffusing screen 116 continues as the center ray 125 of the zero-order light. This center ray is at too steep an angle to totally reflect within the fiber 154, but passes through the interface between fiber 154 and material 160 and is absorbed in the interfiber material 160 without passing out the right side of the faceplate 148. Thus, the zero-order light is absorbed.

That portion of the center ray 105 which is diffracted by the screen 116 enters the faceplate fibers at a small enough angle with respect to the fiber walls that it is totally reflected, and is directed out of the output side of the faceplate 148. This is illustrated by center ray 117 on the fiber center line. Actually, the output is a diffuse light cone with a total cone angle of twice the angle $\phi$ between the outer edge of the input diffuse light and the fiber center line. This effect contributes to uniformity of illumination in the viewing pupil. By designing the center ray of the input diffuse light cone to be parallel to the center axis of the optical fiber, the orientation and angular width of the input diffuse light cone is preserved in the output diffuse light cone of the faceplate.

Figure 9:
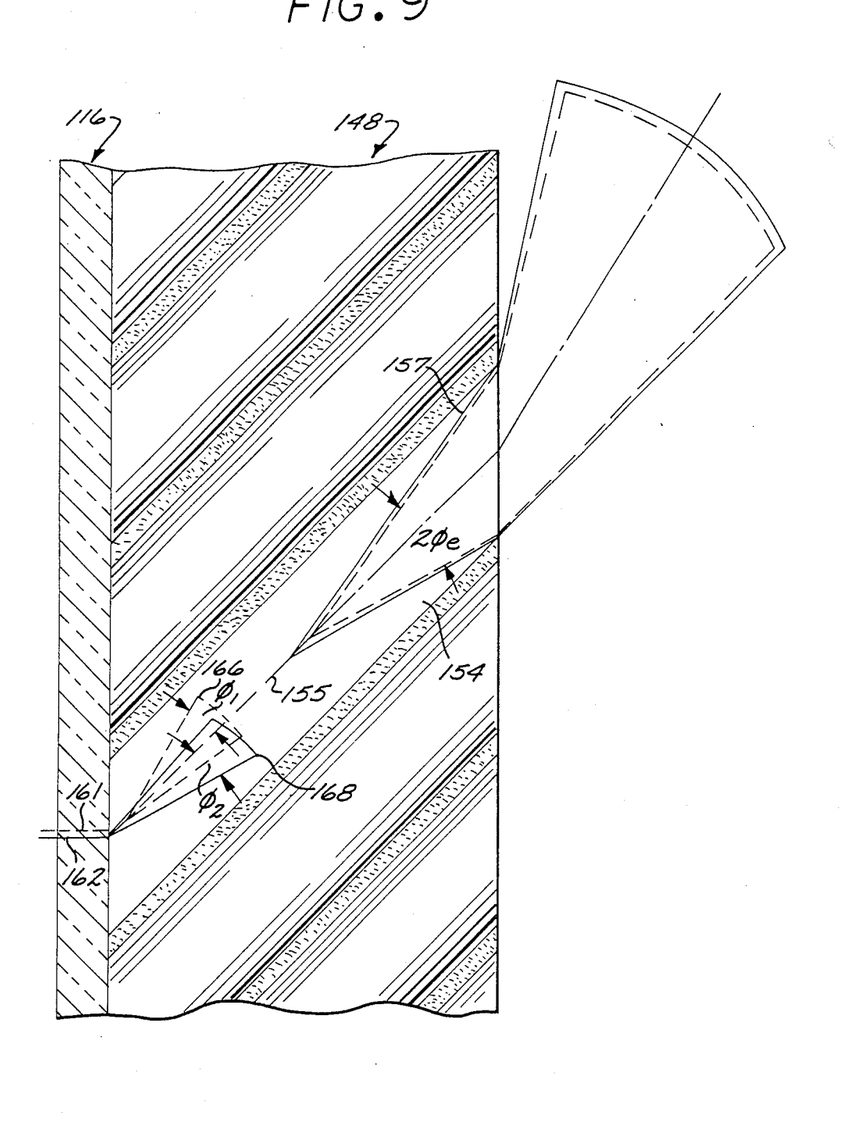
FIG. 9 is a sectional view similar to FIG. 8 showing the manner in which the diffusing screen assembly brings together two separately diffracted color images.

The diffusing screen 116 can diffract light from a multi-color image source to form a multi-color signal beam at the viewing pupil. However, with the different wavelengths of the multi-color light, different amounts of diffraction for each color is achieved in the diffraction element 116. This is illustrated in FIG. 9 where the center ray 161 (dashed line) of an exemplary red beam and the center ray 162 (solid line) of an exemplary green beam are diffracted in element 116. The difference in the diffraction of the two colors is represented by red cone 166 in dashed lines and green cone 168 in solid lines. The diffraction angles of these cones are such that they are both within the total internal reflection critical angle of optical fiber 154 so that they are both totally reflected within fiber 154.

The faceplate 148 scrambles the two light cones 166 and 168 about its central axis and effectively increases the size of the exit pupil. The reason for this scrambling is that the exit cone subtends an angle $2\phi_e$ equally on both sides of the fiber center line 155 when the input half cone angle $\phi_1$ for the red cone and $\phi_2$ for the green cone are equal, as shown in FIG. 9. When the angle $\phi_2$ is larger than $\phi_1$, the scrambled cone at the output of the faceplate subtends an angle $2\phi_2$. Conversely, if the red cone half angle $\phi_1$ is larger than the green cone half angle $\phi_2$, then the scrambled light cone adjacent the output of the faceplate is $2\phi_1$. Thus, if the input cones are adjusted with respect to the faceplate so that $\phi_1$ equals $\phi_2$, then the two cones will be perfectly overlapped in the output cone 157, and the viewing pupil for both of the colors in the faceplate is substantially the same. The scrambling of the two colors in the faceplate brings the two cones out at substantially the same angle so as to project the two color images substantially into the same viewing pupil.

An integrated head-up and panel display system for an aircraft cockpit has been disclosed. The system provides the capability of simultaneous display of head-up imagery and panel display imagery to the pilot. In one embodiment, the two images may be observed from a common system exit pupil.

It is understood that the above-described embodiment is merely illustrative of the many possible specific embodiments which can represent principles of the present invention. Numerous and varied other arrangements can readily be devised in accordance with these principles by those skilled in the art without departing from the spirit and scope of the invention.

What is claimed is:

1. An integrated head-up and panel display system comprising:
    a first image source for projecting a HUD image;
    a second image source for projecting a panel image;
    a combiner for directing HUD image light to a system exit pupil;
    a panel screen for display of panel image light; and
    optical selector means arranged to substantially reflect light from said first image source toward said combiner and to substantially transmit light therethrough from said second image source toward said panel screen.

2. The display system of claim 1 wherein said second image source is adapted to provide a multi-color panel image.

3. The display system of claim 2 wherein said second image source comprises a liquid crystal light valve projector.

4. The display system of claim 1 wherein said optical selector means comprises a diffraction optical element.

5. The display system of claim 1 wherein said optical selector means comprises a substrate having a graded-index coating applied thereon.

6. The display system of claim 1 wherein said panel screen comprises:
    a diffraction optical element for diffusing light incident thereon; and
    optical means having an optical axis along which a ray of light can pass, said optical means being positioned with respect to said optical element so that its optical axis is positioned in substantial alignment with the diffuse rays, the angle of diffracted light from said optical element being sufficiently divergent from the incident light thereon that any undiffracted incident light impinging upon said optical means is absorbed in said optical means.

7. The display system of claim 6 wherein said optical means comprises a fiber optic faceplate having a plurality of substantially parallel optical fibers positioned substantially parallel to the light diffracted by said optical element.

8. The display system of claim 1 wherein said HUD image and said panel image are simultaneously displayed by said combiner and said panel screen respectively.

9. The display system of claim 1 wherein said panel screen comprises a diffusion screen.

10. The display system of claim 1 wherein said optical selector means comprises a selective mirror.

11. The display system of claim 1 wherein the first image source projects a HUD image in a first wavelength band, the second image source projects a panel display image having spectral components in a second wavelength band outside said first band, and the optical selector means is a wavelength selective mirror which substantially reflects light within one of said first or second wavelength bands and substantially transmits light outside the reflected wavelength band.

12. The display system of claim 1 wherein the first image source projects a narrow-band HUD image.

13. The display system of claim 1 wherein the combiner is a wavelength selective optical element which substantially reflects light from said first image source and substantially transmits light at other optical wavelengths.

14. An integrated head-up and panel display system comprising:
a HUD image source for projecting a monochromatic HUD image;
a panel image source for projecting a panel image;
a wavelength-sensitive fold mirror arranged to substantially reflect light of the HUD image and to substantially transmit light of the panel image;
an optical combiner for reflecting said monochromatic HUD image to a system exit pupil and for transmitting ambient light to said exit pupil; and
a look-down display screen assembly arranged to receive light transmitted through said fold mirror for displaying said panel image.

15. The system of claim 14 wherein said screen assembly is adapted to redirect and diffuse the light incident thereon from said panel image source toward said exit pupil.

16. The system of claim 15 wherein said screen assembly comprises:
a Fresnel lens for collimating the light transmitted by the fold mirror;
a homogenous diffusing screen for diffusing the light collimated by said Fresnel lens;
a fiber optic faceplate having a plurality of optical fibers therein arranged substantially parallel to the exit rays from said diffusing screen so that undiffracted rays incident thereon are absorbed in said fiber optic faceplate; and
an optical field lens for refracting the output light from the fiber optic faceplate to converge at the exit pupil.

17. The display system of claim 14 wherein said screen assembly comprises a substantially transparent substrate supporting diffraction holograms for diffracting multi-color light transmitted through said fold mirror.

18. The display system of claim 14 wherein said HUD image source comprises a monochromatic cathode ray tube and a relay lens assembly for directing the HUD image light to said fold mirror at a predetermined first angle.

19. The display system of claim 18 wherein said panel image source comprises a multi-color liquid crystal image projector and a lens assembly for projecting the multi-color image to said fold mirror at a predetermined second angle different from said first angle.

20. An integrated head-up and panel display system comprising:
a first image source for projecting a HUD image;
a second image source for projecting a panel image;
a display system housing having a front panel portion facing a system user;
a HUD fold mirror disposed in the housing between the second image source and the front panel portion for substantially reflecting HUD image light from the first image source;
a combiner mounted on the housing adjacent the front panel portion for receiving HUD image light reflected from the fold mirror and directing it toward the system user;
a panel screen mounted on the front panel portion of the housing for receiving panel image light from the second image source transmitted through said fold mirror thereof visible to the user; and
wherein said HUD image and said panel image are displayed simultaneously.

21. The display system of claim 20 wherein said HUD fold mirror substantially transmits panel image light from the second image source.

22. The display system of claim 20 wherein said HUD fold mirror comprises a holographic diffraction element.

23. The display system of claim 20 wherein said HUD fold mirror comprises a graded-index coating.

* * * * *